United States Patent
Stark (12)

(10) Patent No.: US 8,479,237 B1
(45) Date of Patent: *Jul. 2, 2013

(54) WIRELESS SET-TOP UNIT AND RELATED METHODS

(75) Inventor: John C. Stark, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/977,225

(22) Filed: Dec. 23, 2010

Related U.S. Application Data

(63) Continuation of application No. 12/613,860, filed on Nov. 6, 2009, now Pat. No. 7,895,631, which is a continuation of application No. 10/812,299, filed on Mar. 29, 2004, now Pat. No. 7,647,612.

(51) Int. Cl.
*H04N 7/20* (2006.01)

(52) U.S. Cl.
USPC .................. 725/80; 725/63; 725/81

(58) Field of Classification Search
USPC ......................... 725/63–68, 80–81
See application file for complete search history.

(56) References Cited

U.S. PATENT DOCUMENTS

| 7,647,612 B1 * | 1/2010 | Stark | 725/80 |
| 7,895,631 B1 * | 2/2011 | Stark | 725/80 |
| 2004/0110468 A1 * | 6/2004 | Perlman | 455/13.3 |

* cited by examiner

*Primary Examiner* — Hunter B Lonsberry

(57) ABSTRACT

Disclosed is a set-top box capable of delivering television, internet service, video phone service, video-on-demand, and other media services to a consumer. One portion of the set-top box interacts with a CDMA network for the purpose of receiving wireless internet, video-on-demand, videophone and other IP services. Another portion of the device is satellite-enabled. The satellite portion of the device enables the user to also receive satellite service. Because the set-top box works to receive satellite programming and wireless CDMA network communications, it is not terrestrially-bound. This means it is not bound to be included within a cable, telephone, or other wired circuit network.

18 Claims, 3 Drawing Sheets

WIRELESS SET-TOP UNIT AND RELATED METHODS

CROSS REFERENCE TO RELATED APPLICATIONS

This application is a continuation of U.S. patent application Ser. No. 12/613,860, filed Nov. 6, 2009, which is a continuation of U.S. patent application Ser. No. 10/812,299, filed Mar. 29, 2004 and issued Jan. 12, 2010 as U.S. Pat. No. 7,647,612, which are all entirely incorporated herein by reference.

BACKGROUND

Recently, there is increased demand for the delivery of internet service and video-on-demand to areas inaccessible to cable users. These particular users also tend to prefer satellite audio/video service providers. Presently, however, there is no one delivering a combination of services equivalent to those available to individuals which are includable within a cable or other physically wired service provider.

Satellite television is nothing new. Satellite television is a lot like traditional broadcast television. It's a wireless system which delivers television programming directly to the user's residence. Satellite service is delivered through radio waves.

Satellite broadcasters use powerful antennas to transmit these radio waves to the vast surrounding areas. Users then receive the signal with a much smaller antenna. Both the sending and receiving antennas are typically in a dish shape and will be well known to those skilled in the art. This initial signal transmission is referred to as an "up-link." A satellite is used because the sending antenna transmits the up-link radio waves in essentially a straight line. The signal must be delivered upward, rather than along the horizon, because of two reasons. The first reason is because of obstacles, such as buildings, trees, inter alia. These obstacles will interfere/block the signal before it gets to the user. The second reason is because of the spherical nature of the earth. Because the earth is a sphere, the horizontal delivery of a linear-radio signal will move tangentially away from the earth into space—away from any targets on the earth's surface. Thus, it is necessary for the signal to be delivered upward, and bounced off of something. After it is bounced, the signal is directed back down to receiving antennas owned by satellite-subscribing residences. The transmission downward after the bounce is commonly referred to as the "down-link."

Nowadays, satellite broadcasts are almost completely digital. The same up-link/down-link principles referred to above also apply to digital satellite setups. These digital arrangements typically provide great picture and sound quality. The signal is generated by the streaming of data files. The most common form of this type of file is what is known as an MPEG. MPEG stands for Movie Pictures Experts Group. MPEG's comprise video recorded digitally which is converted into digital bits and compressed. These files may come in a variety of versions, e.g., MPEG-1, MPEG-2, MPEG-3, and MPEG-4.

Once a satellite signal is received by the antenna/dish at a customer's residence, the signal is transferred to a receiver inside the viewer's house. The receiver is the end component in the satellite/TV system. It takes the digital MPEG signal and converts it to analog. Analog format is recognized by a decoder in a standard television which then displays the video content. Thus, the digital MPEG is able to be recognized and displayed on the television. The receiver may also engage in descrambling of encrypted signals, recording billing information, and some even have built in video recorders which enable the pausing or recording of live television by recording it in memory or on a hard drive for the consumer's convenience.

In-residence receivers like this are typically contained within what is commonly referred to as a set-top box. Unfortunately, these conventional satellite set-top boxes are unable to obtain video-on-demand, or other IP-supported features such as internet services. Because of this the consumer is not able to surf the net on their television Likewise, they cannot answer emails or engage in video phone conferencing. Other examples are too numerous to mention here.

Satellite providers are unable to fulfill these requirements because of the lack of the lack of up-link capabilities back to the satellite from the consumer. For the use of the there must be interfacing between the consumer and the IP network. The conventional satellite arrangement can not accomplish this because there is only a down-link to the consumers set-top box. The consumer is unable to talk back to the provider, so to speak.

It is known in the art to use a satellite for interactive purposes, wherein the satellite is engaged in sending and receiving data from a provider to an end user. For example, phone services have been provided in which the user is afforded an up-link to the satellite enabling bilateral communications with a consumer. SATPhones are an example of this. These types of services, however, are excessively expensive—typically as much as $10 per minute. These exorbitant costs preclude the typical satellite provider from giving consumers bilateral access to a satellite simply for the purpose of IP access. Therefore, this course has not been pursued by satellite programming providers.

Wired-IP networking has been used to provide video-on-demand to cable subscribers. This is done by the cable service provider by maintaining a video-server farm. On the server farm are multiple instances of the same MPEG file, e.g. movies. On the same or other server farms there will be multiple versions of other movies—things that the consumer will want to see at their leisure on a schedule of their choosing. With this type of arrangement the cable provider transmits MPEGs, on demand, to a user in a residence through the existing cable system which is already in place. The video may be either streamed or downloaded into a cable box provided to the end user. Usually the later.

The data will be transferred as follows. First, the version will be drawn out of the server farm and transmitted into an IP network, e.g. the internet. From there, it will be transmitted to the consumer's set-top box, which includes a microcomputer. The MPEG is then downloaded and stored in a memory component of the microcomputer. In this manner, the user may watch the movie at that instance or save it for later at some desired time period.

One problem with these prior art video-on-demand systems is that they are terrestrially-bound. By this, it is meant that there must be a physical cable or other kind of physical connection (e.g., fiber optic cable, existing phone lines) run over the ground to the consumer. The requirements for a physical connection are sometimes too much. Often times, cable services will not be able to reach rural areas, because to do so is economically unfeasible. These more remote places are typically the areas in which satellite is most popular. For example, it's common when driving in the country to see house after house with satellite receiving antenna dishes. This is typically because these consumers are unable to obtain cable service. As a result, they are faced with satellite as their only option for obtaining good quality reception of numerous programming options (e.g., many channels) for their viewing pleasure.

These consumers, however, have conventionally missed out on the IP-connection benefits afforded to cable subscribers. Cable services have begun to offer phone and internet service in addition to television programming to providers. Satellite subscribers have missed out on this opportunity because of their lack of connectivity.

Thus, there is a need in the art for a system that provides all the above-described benefits existent in an in-home wired arrangement which, however, is not terrestrially-bound like the prior art systems.

SUMMARY

It is therefore an object of the present invention to provide a system for and a method of providing satellite, video-on-demand, internet services, video telephony, and other media-related features to the consumer without the drawbacks present in the prior art. This is accomplished by providing a system for and method of transmitting video programming using a satellite while at the same time offering IP services, including on-demand video programming over a wireless network connection.

The set-top box of the present invention incorporates a plurality of wireless components. First, the consumer's set-top box includes a satellite signal receiver. This enables the consumer to view programming via satellite.

Also located in the same set-top box is equipment necessary in order for the consumer to connect to a CDMA network, to enable IP access via a wireless signal. This wireless signal is accessed by an air card which enables the user to receive telephone service, video-on-demand, internet and other IP-type services remotely.

The result is a set-top box that provides all the benefits of satellite along with all the benefits of an IP connection without being terrestrially-bound.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
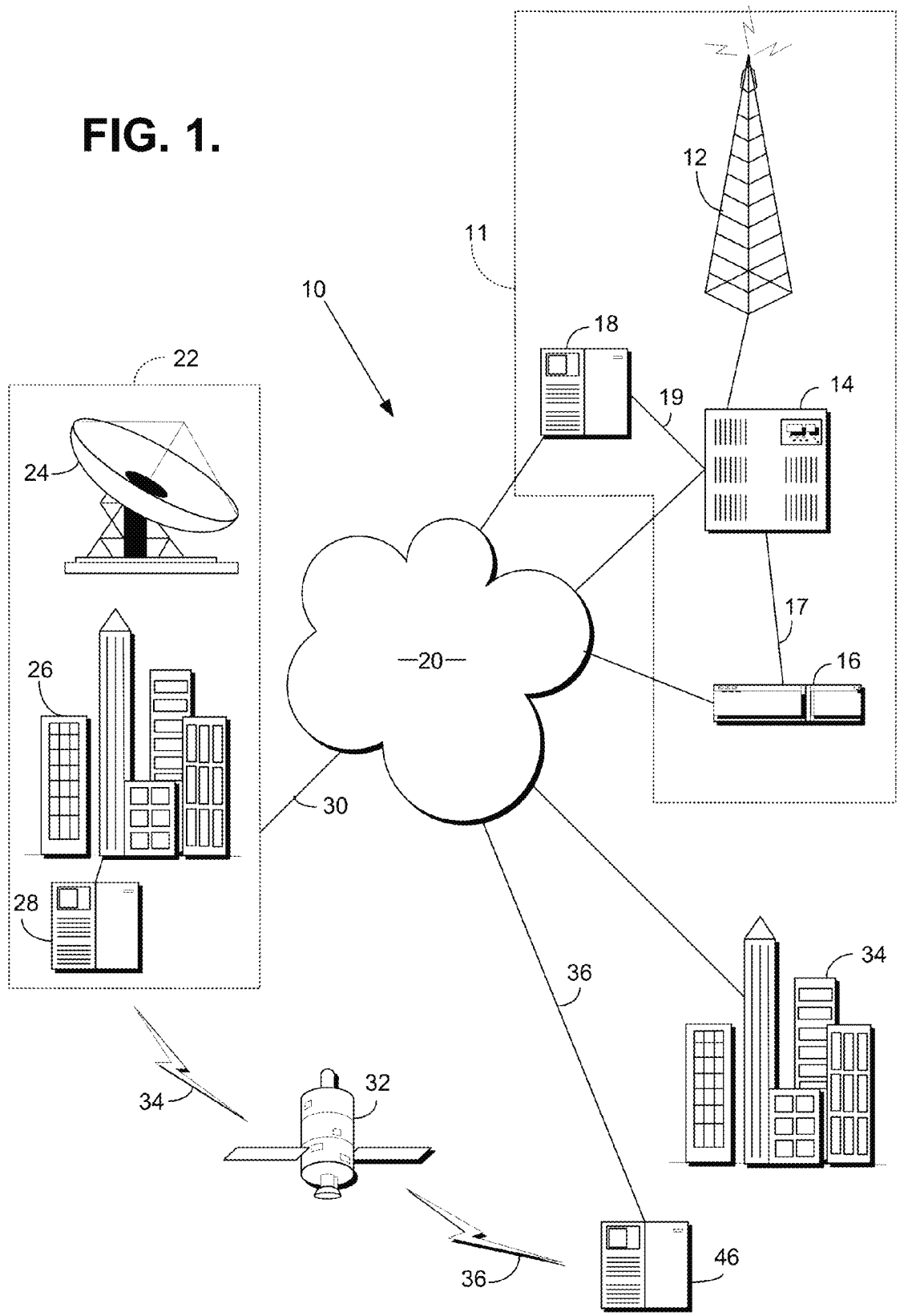
FIG. 1 shows the system of the present inventions including its many supporting components.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition for most of these terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. The computer-storage media is non-transitory, even though it may store transitory data. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

The system of the present invention overcomes the deficiencies in the prior art systems by combining satellite components along with wireless components in the same set-top box which is maintained in the residence.

With respect to it's wireless side, the box includes a slot which receives what is known in the art as a PCMCIA (Personal Computer Memory Card International Association) Type-II card. PCMCIA Type-II cards are also commonly referred to as "aircards," and are well-known in the art. They are essentially wireless modems used to send and receive wireless signals. They typically use a pin-connector system and are thus, removable. They are most commonly used with laptops or handheld devices.

The PCMCIA Type-II device also includes an antenna through which the digital sending and receiving takes place. In the preferred embodiment of the invention, the wireless networking is done in a Code Division Multiple Access (CDMA) wireless network. This enables the user to receive voice override to IP along with video-on-demand and other related IP features without the need of running a terrestrial line to the house.

With respect to the satellite side of the set-top box, the box of the present invention is also equipped with a satellite receiver. This receiver is capable of receiving a digital satellite signal. It works along with other associated equipment. The other equipment may include a video card and a scan converter.

The set-top box of the present invention also includes the use of a second wireless network that enables PC interfacing between the box and a keyboard, camera with microphone, and a mouse.

The combination of satellite and wireless technologies creates an entirely non-terrestrial arrangement which is able to compete head-to-head with traditional cable service providers. Additionally, it enables satellite users to obtain the same services conventionally available only to cable customers. This might be most useful to customers in remote areas in which wireless arrangements are more practical.

Figure 2:
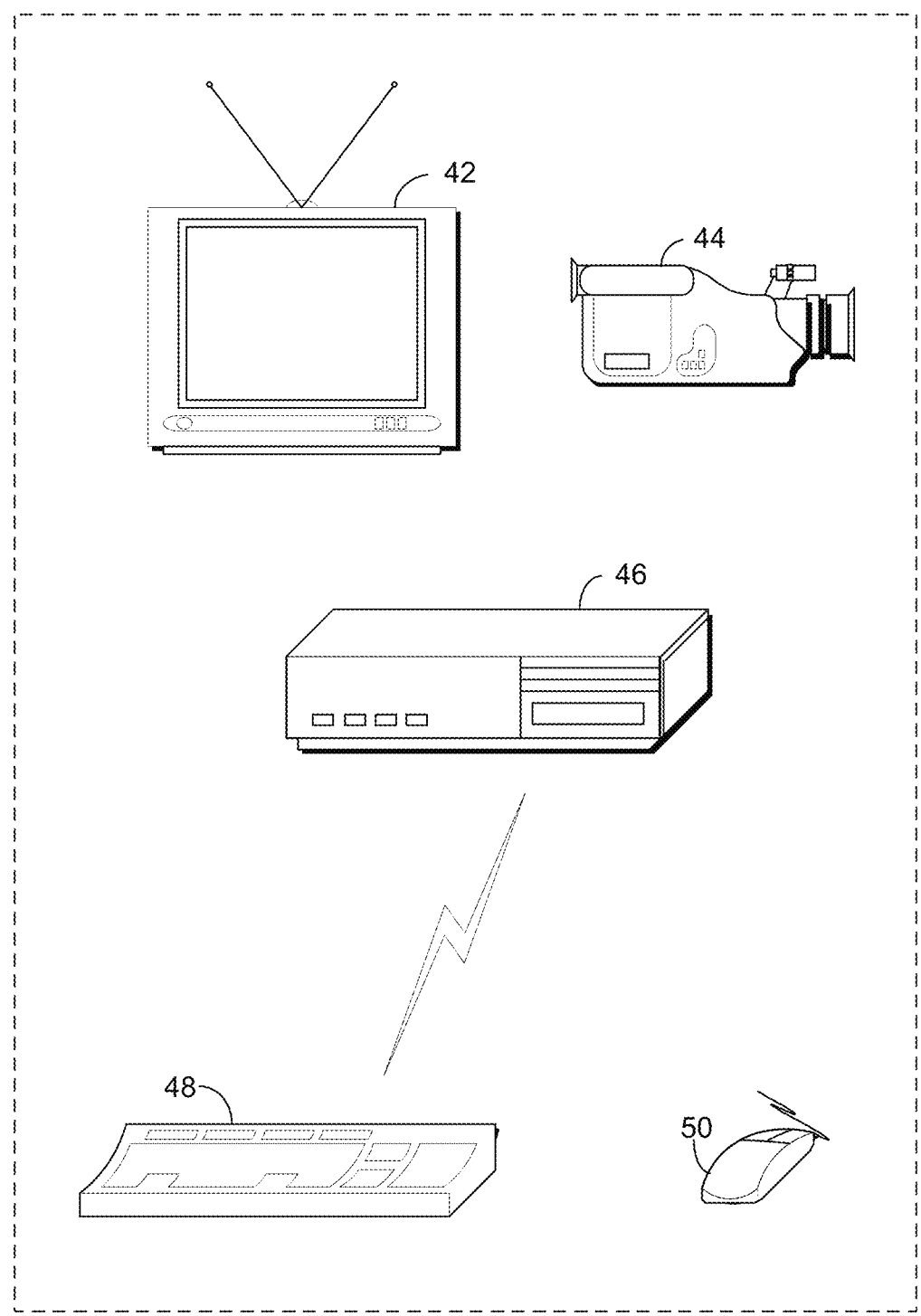
FIG. 2 discloses the set-top box of the present invention along with its accessories.
Figure 3:
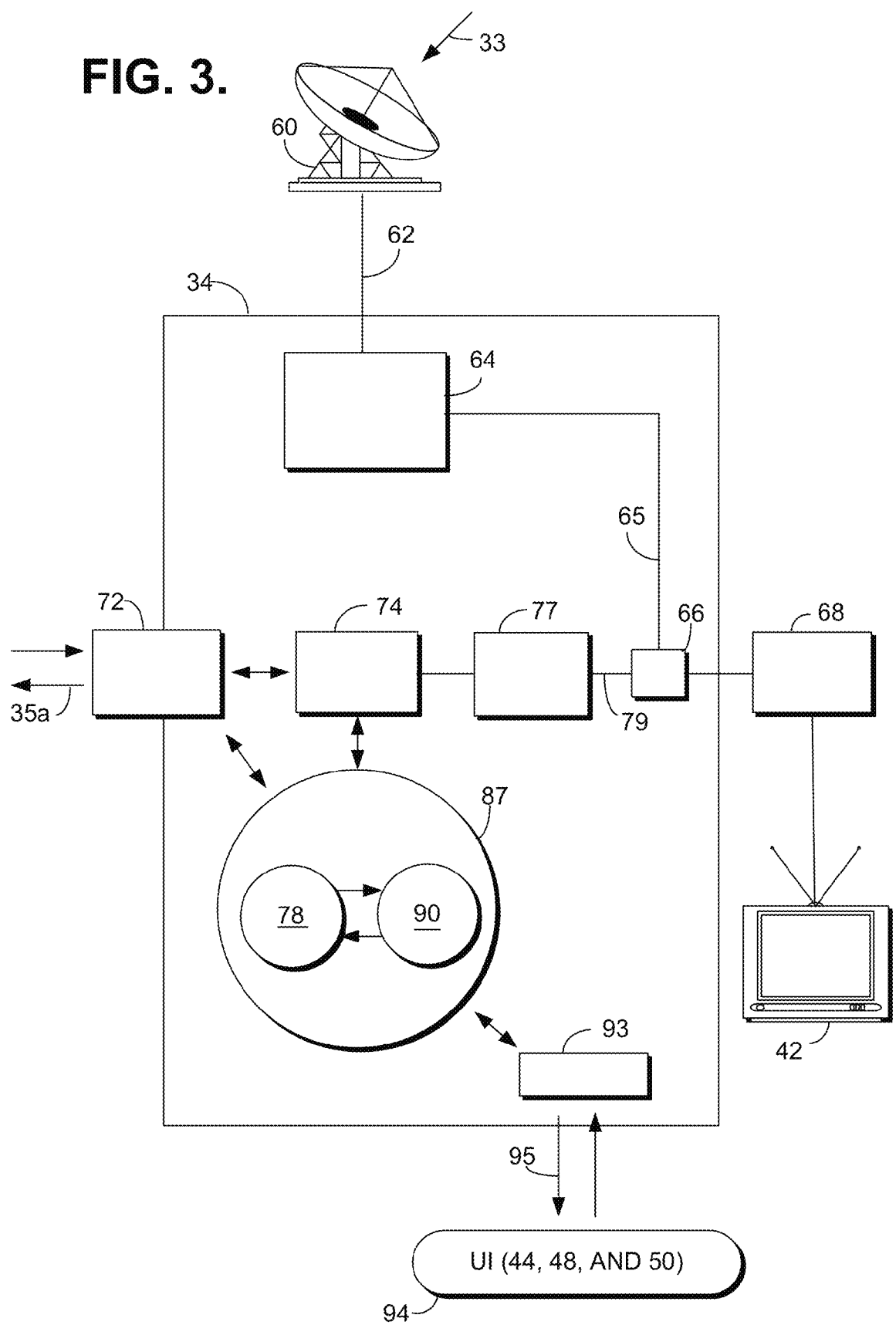
FIG. 3 shows the set-top box of the present invention in more detail and includes it's internal components and interfacing arrangements.

The system of the present invention is shown in detail in FIGS. 1 through 3. Referring first to FIG. 1, the set-top box of the present invention may be seen in its working environment, as system 10. Included in the system 10 is a CDMA network along with its support facilities 11.

A CDMA network is a digital, spread spectrum access technique which is packet based. It is usually used along with RF radio systems. Because it is in digital format, data transmitted over a CDMA network can be compressed to reduce the number of bits transmitted. This makes more efficient use of the limited RF spectrum. Each transmission includes a stream of data packets. Each stream is assigned a ten bit code sequence. The code is included in the front of each packet in the packet stream. This enables receivers to separate that specific transmission from other internet noise or other noise that may be present on the particular RF channel. This enables different packets associated with different conversations or video content to be shared in the same spectrum. Thus, there can be overlap in frequency and time without the creation of interference.

The CDMA support facilities 11 include a transceiver tower 12, a packet network switch 14, a router 16, and an ATM networking device 18. Transceiver tower 12 is used to send and receive wireless microwave radio frequencies which will be accessed by users of the CDMA network. Packet network switch 14 is used to switch traffic at the core of an IP/MLS network core 20 in a manner known to those skilled in the art.

Router 16 is used to handle the more complex traffic at the periphery of the IP/MLS network core 20. ATM networking device 18 serves to support the ATM protocol functions necessary for the support of the CDMA network.

System 10 also includes a satellite service providing system 22. Included in satellite service providing system 22 is a satellite transmitting device 24. Satellite transmitting device 24 is a satellite signal transmitting dish. The provider will be located at a particular provider location 26, e.g., Kansas City. Satellite transmitting device 24 will be used to deliver satellite programming in the traditional sense.

Also at provider location 26, however, is a server farm 28, which is simply one or more video servers. Unlike the satellite providers of the past, satellite service providing system 22 uses a server farm 28 to deliver video-on-demand services to its customers. Server farm 28 is shown in FIG. 1 to be in the same location as satellite transmitting device 24. It could instead be located at some remote location, however. Server farm 28 is simply one or a group of video servers.

Video servers are heavy duty computing devices that are well known in the art. They are typically capable of storing hundreds, or even thousands of movies which are viewable by subscribers at any time desired. They usually have a number of large hard drives. These have been used by cable and phone service providers in the past to provide video on demand to customers.

As used in the system 10 of the present invention, these servers maintain the numerous MPEG's for video on demand which will be delivered to customers. This is done by transmitting a digital signal into an IP/MLS network core 20 by way of an internet connection 30, or other means.

On the other satellite side of the satellite service providing system 22, satellite programming will be transmitted from a satellite transmitting device 24 in an uplink signal 31. Uplink signal 31 will then be bounced off a satellite 32 in a manner known to those skilled in the art. Once uplink signal 31 is bounced off satellite 32 it will rebound off in a downlink signal 33. Downlink signal 33 may be received by any number of subscribers.

These subscribers will have purchased or otherwise acquired a receiving satellite dish like receiving antenna 60 in FIG. 3. These users will aim their receiving dishes at satellite 32 in order to receive video content.

The present invention also includes a set-top box 34. The set-top box 34 of the present invention is adapted to receive both satellite and CDMA wireless communications. Referring to FIG. 1 this means set-top box 34 will be adapted to receive downlink signal 33 as well as CDMA signal 35. Because it is satellite and CDMA equipped, set-top box 34 may be located anywhere these signals may be received (almost anywhere) and does not have any "terrestrial" requirements. In other words, it does not need a wired/physical connection in order to deliver the excellent broadcast programming and pay-per-view options available via satellite, but will also provide the benefits of internet, phone, video-on-demand, and other IP-based services.

Possible accessories that might be used with set-top box 34 are shown in FIG. 2 as set-top box system 40. First, set-top box 34 will normally be physically connected to a television 42 in order to display audio/visual content such as broadcasts, movies, video conferencing, internet surfing, and other transmissions. Other than a power cord (not shown), television 42 is the only device which will be connected physically (wired) to set-top box 34. It is of course possible, however, that other devices or the devices shown in FIG. 2 could also be physically connected and still fall within the scope of the present invention. In the FIG. 2 preferred embodiment, however, they are not.

Internally, set-top box 34 includes a microcomputer 87 and a PC interface 93 (not shown in FIG. 2, see FIG. 3). PC interface 93 enables interfacing via a signal with a keyboard 48, a mouse 50, and a camera 44 remotely as shown in FIG. 2. This remote interfacing with the microcomputer 87 in set-top box 34 may be accomplished in a number of ways. Here, this is done by employing a WiFi arrangement. These types of short range networking arrangements are well known, and will be within the knowledge of one skilled in the art. A WiFi card may be installed in set-top box 34. It communicates with the microcomputer 87 inside and functions in a manner which will be known to one skilled in the art. Such arrangements are available over the counter and are readily available.

Mouse 50 and keyboard 48 may be used to perform computing functions. With the disclosed arrangement, television 42 serves in the same fashion as a computer monitor, displaying prompts, text, and graphics.

Because of the system's wireless WiFi capabilities, the user may be positioned anywhere in the room in which the television 42 exists (possibly anywhere in the residence) and will not be constrained by any type of physical connection (e.g., wiring).

Camera 44 will be used for video conferencing and other functions known to those skilled in the art. By directing camera 44 at a user, the user may conduct video conferencing by speaking into or close to a microphone 45 on said camera 44. It may be preferable, however, to use a wireless headset (such as a Bluetooth® wireless headset arrangement which would work in conjunction with the wireless mouse 50 and keyboard 48 in a manner known to those skilled in the art). Either wireless conferencing arrangement will enable said user to communicate in real time with other persons who have the same set-top box 34 in their residence as will be discussed hereinafter.

FIG. 3 shows more specifics regarding the set-top box 34 of the present invention. As already discussed, set-top box 34 has both satellite and wireless features.

We will first discuss the satellite features. Satellite downlink signal 33 is received by a receiving antenna 60 usually installed somewhere on the user's residence. Usually this type of antenna is dish shaped. Dishes like receiving antenna 60 are commercially available and often times supplied by the service provider for the purpose of receiving satellite audio/video content as well as live programming. The parabolic shape of the dish focuses the satellite downlink signal 33 into a horn which will be used to transmit the signal through a conduit into the residence. Through this conduit, a digital signal 62 is transmitted to a satellite receiving device 64 within set-top box 34.

Satellite receiving device 64 will process the digital signal 62 and pass it on so that it may be used by a standard television. Satellite receiving device 64 has four essential functions.

First, it will typically descramble an encrypted signal. Satellite signals (e.g. downlink signal 33) are typically transmitted in encrypted format so that other users may not pirate the service from the service provider. Thus, satellite receiving device 64 will likely include a decoder chip provided along with the satellite receiving device 64.

Second, satellite receiving device 64 will convert digital signal 62 into an analog signal 65. As you will recall from above, most digital signals are in MPEG format. Satellite receiving device 64 will function to convert this MPEG into an analog NTSC format. Optionally, the receiving antenna 60 and satellite receiving device 64 arrangement may be set up to handle an HDTV signal.

Third, satellite receiving device 64 performs an extraction of individual channels from the larger satellite signal. In a manner known to those skilled in the art, the user will select a channel on set-top box 34. This third functionality of satellite receiving device 64 (which is well known to those skilled in the art) will take the channel selected and extract it from the bulk digital signal 62.

Fourth, satellite receiving device 64 will likely perform billing functions, such as keeping track of any pay-per-view accessed by user in the residence which will be communicated to service provider so that the consumer will be charged for the satellite services used. Receiving arrangements such as those disclosed for satellite receiving device 64 are well known to those in the satellite television industry and will fall within that which is known to those skilled in the art.

Once digital signal 62 has been descrambled, converted, and appropriately extracted by satellite receiving device 64, a resulting analog signal 65 will be recognizable by and displayed on a television 42. Before reaching television 42 the signal will be incorporated into a junction 66 and delivered into a cable/television network 68 comprising at least one television 42. Television 42 may thus be used to view satellite broadcasts.

We will now discuss the wireless side of set-top box 34. As mentioned above, the wireless network used in the preferred embodiment invention is what is known as a code division multiple access ("CDMA") network. Other wireless technologies, however, could be used as well. For example wireless technologies such as time division multiple access ("TDMA"), frequency-division multiple access ("FDMA"), wide band CDMA ("W-CDMA"), global system for mobile communication ("GSM"), or blue tooth could also be used and still fall within the parameters of the present invention. CDMA has been used here in the preferred embodiment, however, because it is the best developed to meet the objectives of the present invention. Wireless signaling 35a will occur between set-top box 34 and a transceiver tower 12 (see FIG. 1). Transceiver tower 12, as you will recall, is part of the wireless provider's support facilities 11 used to create the CDMA network.

Communications between the transceiver tower 12 and set-top box 34 is made possible using an aircard 72, such as a Type-II PCMCIA card. PCMCIA aircard 72 taps set-top box 34 into high speed wireless. As already discussed above, such cards have conventionally been used to wirelessly enable laptops and hand helds via an enhanced wireless network, e.g. CDMA. Here, aircard 72 is being used to make set-top box 34 CDMA capable.

Aircard 72 is physically connected into set-top box 34 by inserting it into a Type II pin slot (not shown) which is provided on the set-top box 34. Such a card is able to provide speed, always on access to the , e-mail, etc. It also enables the user to receive voluminous packet data through streaming for downloading (or unsaved streaming). Aircards 72 like PCMCIA card have a built-in antenna. The antenna is capable of both transmitting and receiving. One example of such a card is The PCS Connection Card™ manufactured and commercially available from Siena Wireless (also called an AirCard 550). Numerous other examples could also be used that are commercially available and will be known to those skilled in the art.

Aircard 72 is shown in FIG. 3 as being already inserted into a Type II slot (not pictured) in set-top box 34. Aircard 72 enables interfacing between a microcomputer 87 in set-top box 34 with the wireless service provider through wireless signaling 35a. Aircard 72 also allows the streaming or downloading of audio/video content, e.g. video-on-demand. It will also enable internet access. It should be noted here that the internals of set-top box 34 may vary significantly and that numerous other computing devices would likely be contained within any such device. These however, would fall within the scope of one skilled in the art and, though omitted here, the addition of these components would likely be evident to one skilled in the art.

Microcomputer 87 is the brains of set-top box 34. Like most microcomputers, microcomputer 87 includes, at a minimum, a memory component 78 and a processing component 90. Memory component 78 may be used to store movies and other desired data. Alternatively, other memory components could be used which are foreign to microcomputer 87. For example, a separate drive might even be included in set-top box 34 which would be able to store large numbers of MPEG files. Here, however, for the sake of simplicity a single memory component 78 has been illustrated.

When video programming is streamed into set-top box 34 via aircard 72, it may be simultaneously viewed, or downloaded into memory component 78 for later use. In order for the digital MPEG to be viewed on a standard television, it must be acted on by a video component 74. Video component 74 may be what is referred to as a video card. It takes digital information included in the MPEG and assign it pixels, etc. to develop a moving picture which is viewable on a computer monitor or other like display.

Computer video is not automatically visible on a standard television, however, because the two have different scanning rates (the rate at which the screens are refreshed). Therefore, a scan converter 77 is necessary to convert the computer scan rate to the television rate. Scan converters 77 are well known in the art and readily available to be used for the purpose of converting computer video to television video. Scan converter 77 contains both analog and digital circuitry. This circuitry is used to transform the standard digital computer signals into the more domestically usable analog signals. TVs, VCRs, and DVDs all operate on analog. Thus, a scan converter here is also being used as a decoder, decoding the digital signal introduced into an analog signal 79 which is usable within the residence.

Analog signal 79 which is received through aircard 72 over the CDMA network and analog signal 65 which is received from the satellite receiving antenna 60, enter into the same information channel. To do so, they are combined into one line of communication by the junction 66, which is also known as a combiner. This could simply be a T-junction, or perhaps a more sophisticated combining device. This is done so that one outlet can be provided on set-top box 34 which is accessible by a cable/television network 68 which will include at least one television 42.

When a user interfaces with the set-top box 34 using the keyboard 48 or mouse 50, that user will be able to view the interfacing which is taking place over television 42—just as if it was a computer monitor. These interactions will occur through a wireless PC interface 93 which is included in set-top box 34. This PC interface 93 will communicate with the microcomputer 87 to control the set-top box 34. PC interface 93, in the preferred embodiment is a home wireless networking arrangement.

Camera 44, keyboard 48, and mouse 50 are all included in this wireless network as different devices therein. PC interface 93, in the preferred embodiment, comprises a wireless networking card. These are available in the market. The most common version is an 802.11b wireless networking card. For even faster performance, however, an 802.11g network enabling card could be used. The setup of networks using cards like this will be readily apparent to and known by one skilled in the art. These kinds of networking arrangements are commonly referred to as "Wi-Fi" local area networks.

The establishment of such a network enables the interfacing devices 94, which include camera 44, keyboard 48, and mouse 50 with the computing devices in set-top box 34 via wireless communication 95. Wi-Fi cards are typically capable of operating at high speeds such that performance will not be impeded.

Referring now back to FIG. 1 we see that a user with an identical second set-top box 38 in a different or second location 39 may maintain video phone communications with the user at a different location of set-top box 34. For example, the user at the provider location 26 of set-top box 34 may have a friend that resides in second location 39 with which the user wants to keep in touch. Video communications would be possible using system 10. This would be possible because each user would have a camera, like camera 44 in FIG. 2, with a wireless connection to each of set-top boxes 34 and 38. They could communicate via wireless IP with one another directly through the wireless support facilities 11. With respect to the friend's second set-top box 38 at second location 39, this would occur through a digital wireless signal 36 which would be received through transceiver tower 12 and communicated into support facilities 11 and then transmitted to the user of set-top box 34 via wireless signaling 35*a*.

The user of second set-top box 38 ("friend") would also have all the other advantages provided to the user of set-top box 34, such as video-on-demand, satellite, and internet access. Again, like with set-top box 34, second set-top box 38 would not be terrestrially dependent at all.

As can be seen from the above, the present invention and its equivalents are well adapted to provide a new and useful method of and system for delivering audio/video content to an end user using a set-top unit. Many different arrangements of the various components depicted, as well as components not shown, are possible without departing from the spirit and scope of the present invention.

The present invention has been described in relation to particular embodiments, which are intended in all respects, to be illustrative rather than restrictive. Alternative embodiments will become apparent to those skilled in the art that do not depart from its scope. Many alternative embodiments exist but are not included because of the nature of this invention. For example, one skilled in the art will recognize that the aircard 72 might be performed to also conduct all of the wireless PC interfacing done by PC interface 93. Interfacing devices 94, which include camera 44, keyboard 48, and mouse 50 could be adapted to be patched in through aircard 72 such that a separate interface would not be necessary. Here though, the present invention has been set up with two interfaces so that it would be more economically feasible and more practical. A skilled artisan could develop alternative means of implementing the aforementioned improvements without departing from the scope of the invention.

It will be understood that certain features and subcombinations are of utility and maybe employed without reference to other features and subcombinations and are contemplated within the scope of the claims below. Not all steps listed in the various figures or described above need be carried out in the specific order described.

The invention claimed is:

1. A multiple network service system, comprising:
   a satellite service component for receiving a satellite downlink signal;
   a wireless IP component, comprising a wireless modem for sending and receiving a wireless signal via a wireless network, wherein the wireless signal is received from a transceiver tower via the wireless modem;
   an Internet component;
   a set-top box for receiving the satellite downlink signal, the wireless signal, and data from the Internet component;
   a microcomputer for controlling the set-top box; and
   a television networking arrangement for serving audio and video content via the set-top box.

2. The system of claim 1, wherein the wireless IP component enables interfacing between the microcomputer and an IP wireless service provider.

3. The system of claim 1, wherein the wireless IP component enables streaming of the audio and video content.

4. The system of claim 1, wherein the wireless IP component enables access to the Internet component.

5. The system of claim 1, wherein the wireless modem comprises an aircard.

6. The system of claim 1, wherein the wireless network comprises a code division multiple access (CDMA) network.

7. The system of claim 1, wherein the computing interface comprises a wireless networking card.

8. The system of claim 1, further comprising: a junction device for combining multiple signals to be delivered to the television networking arrangement.

9. The system of claim 1, further comprising: a computing interface for interfacing external computer accessories with the microcomputer.

10. The system of claim 9, further comprising: real-time communication between a local user of the multiple network service system and a remote user of a second multiple network service system.

11. The system of claim 10, wherein the real-time communication comprises sharing the audio and video content between the local user and the remote user.

12. The system of claim 10, wherein the real-time communication comprises a video conferencing arrangement.

13. The system of claim 9, wherein the computing interface and the wireless modem comprise a singular wireless interface.

14. One or more non-transitory computer-readable media having computer-executable instructions embodied thereon that, when executed by a computing device, facilitate a method of providing multiple network services, the method comprising:
    receiving a downlink satellite signal into a set-top box system;

receiving a wireless IP signal from a transceiver tower into the set-top box system;

receiving data via an Internet connection into the set-top box system;

serving audio and video content from the downlink satellite signal, the wireless signal, and the Internet connection via the set-top box system; and receiving a wireless IP signal from a user in a remote location into the set-top box system.

15. The media of claim 14, further comprising receiving a video communication into the set-top box system from a remote set-top box system.

16. The media of claim 15, wherein the receiving a video communication comprises real-time communication between a first user of the set-top box system and a second user of the remote set-top box system.

17. The media of claim 14, further comprising transmitting video programming to a user device.

18. A method of providing multiple network services, comprising:

receiving a downlink satellite signal into a set-top box system comprising a set-top box;

receiving a wireless IP signal from a transceiver tower into the set-top box system;

receiving data via an Internet connection into the set-top box system;

serving audio and video content from the downlink satellite signal, the wireless signal, and the Internet connection via the set-top box system; and receiving a wireless IP signal from a user in a remote location into the set-top box system.

* * * * *